(12) United States Patent
Spratt et al.

(10) Patent No.: US 8,297,751 B2
(45) Date of Patent: Oct. 30, 2012

(54) MULTI-FOCAL LENSES WITH SEGMENTED BOUNDARIES

(75) Inventors: Ray Steven Spratt, Petaluma, CA (US); Darryl Meister, Olathe, KS (US); Wolf Krause, Essingen (DE)

(73) Assignees: Carl Zeiss Vision Inc., Petaluma, CA (US); Carl Zeiss Vision International GmbH, Aalen (DE)

( * ) Notice: Subject to any disclaimer, the term of this patent is extended or adjusted under 35 U.S.C. 154(b) by 222 days.

(21) Appl. No.: 12/765,146

(22) Filed: Apr. 22, 2010

(65) Prior Publication Data
US 2011/0261318 A1 Oct. 27, 2011

(51) Int. Cl.
*G02C 7/04* (2006.01)
*G02C 7/06* (2006.01)
(52) U.S. Cl. .............. 351/159.41; 351/159.05
(58) Field of Classification Search .......... 351/161, 351/164, 168–172, 159.05, 159.06, 159.1, 351/159.14, 159.17, 159.41, 159.42, 159.43, 351/159.45, 159.48
See application file for complete search history.

(56) References Cited

U.S. PATENT DOCUMENTS

| | | | |
|---|---|---|---|
| 4,461,550 A | 7/1984 | Legendre | |
| 4,806,010 A | 2/1989 | Ewer et al. | |
| 4,952,048 A | 8/1990 | Frieder et al. | |
| 4,955,712 A | 9/1990 | Barth et al. | |
| 5,953,099 A * | 9/1999 | Walach | 351/168 |

FOREIGN PATENT DOCUMENTS
WO WO/82/03129 9/1982

OTHER PUBLICATIONS

"Sola SmartSeg . . . The First Flat Top That Doesn't Miss the Middle," product brochure, Sola (2000).

* cited by examiner

*Primary Examiner* — Darryl J Collins
(74) *Attorney, Agent, or Firm* — Goodwin Procter LLP (57) ABSTRACT

The invention provides multi-focal segmented lenses with boundaries that include at least one blended portion and at least one sharp portion. The lenses may possess, for example, the aesthetic advantage of blended multi-segment or progressive lenses while largely retaining the functional advantage of multi-segment lenses with sharp segment boundaries.

20 Claims, 6 Drawing Sheets

MULTI-FOCAL LENSES WITH SEGMENTED BOUNDARIES

FIELD OF THE INVENTION

The present invention generally relates to multi-focal ophthalmic lenses. More particularly, various embodiments relate to segmented lenses having partially blended boundaries between different viewing zones.

BACKGROUND

Ophthalmic lenses used in eyeglasses can be designed to correct for any of a number of vision defects, including nearsightedness (myopia), farsightedness (hyperopia), astigmatism, and reduced ability of the eye's crystalline lens to accommodate, i.e., to focus on nearby objects (presbyopia). People with a combination of contrary vision impairments, e.g., people suffering from both presbyopia and either myopia or hyperopia, are often prescribed lenses with two or more viewing zones (i.e., lens portions designed to provide certain visual aids to the wearer) of different refractive powers (also referred to as "dioptric" powers) that compensate for these different defects. In conventional multi-focal lenses, the transitions between the various viewing zones are abrupt, whereas in progressive lenses, they are smooth.

Figure 1A:
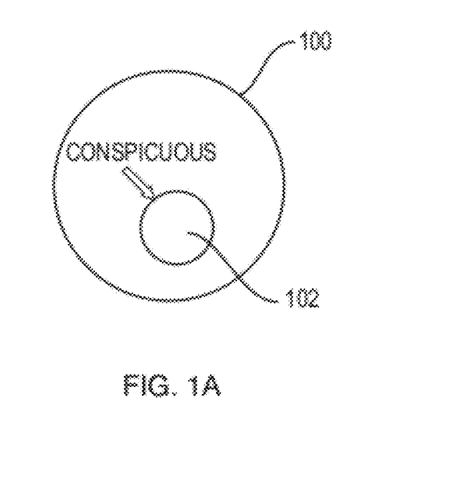
FIG. 1A is a schematic front view of a bifocal lens with a round add segment.

Examples of multi-focal lenses are conventional bifocal lenses, which often have a lower refractive power (caused, e.g., by a less convex front surface) in the upper half to facilitate distance vision, and a higher refractive power (caused, e.g., by a more convex front surface) in the lower half, or a portion thereof, to aid in close viewing. Modern bifocal lenses typically reserve the main portion of the lens for distance vision, and a smaller portion located in the lower half for near vision. The smaller portion for near vision is often referred to as the "reading segment," "add segment," or simply "segment." FIG. 1A illustrates schematically a lens 100 with a round reading segment 102. Trifocal lenses include three zones for distance, intermediate (i.e., about arms-length), and near vision. In general, multi-focal lenses may have any number of corrective zones with abrupt transitions between the zones.

Figure 1B:
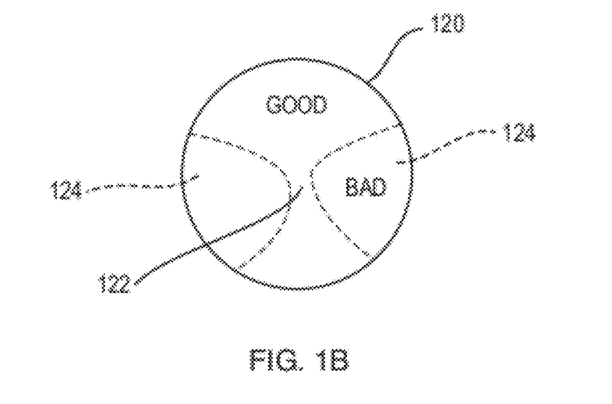
FIG. 1B is a schematic front view of a progressive lens.

An alternative to multi-focal lenses (in particular, lenses containing multiple zones with different constant dioptric powers) are lenses whose dioptric power varies continuously within at least a portion of the lens and which, consequently, feature smooth transitions between the different viewing zones. Such "progressive" lenses may feature a first surface (e.g., the back surface) having a constant radius of curvature and a second surface (e.g., the front surface) having a variable radius of curvature, or vice versa. For example, the front surface may have a constant large radius of curvature in an upper zone, a constant small radius of curvature in a lower zone, and a radius of curvature that varies gradually between the large and the small radius in a middle zone. This middle zone may enable intermediate-distance viewing. In general, progressive lenses need not contain spherical portions having a single radius of curvature, but may, for example, have portions with two different radii of curvature. Examples include lenses with toric or cylindrical power distributions (e.g., lenses having different horizontal and vertical radii of curvature). Progressive lenses have aberrations (e.g., an undesired astigmatism in the periphery of the intermediate progressive zone) associated with them, which may significantly reduce the field of correct vision. In general, the distortions are greater (and more annoying to the wearer), as the range of dioptric powers increases in the region spanned by the progressive zone. FIG. 1B illustrates schematically a progressive lens 120 having dioptric power that varies continually along a central meridian in a middle zone. The lens provides only a narrow region 122 of correct intermediate vision, which is flanked by regions 124 of high distortion.

Figure 1C:
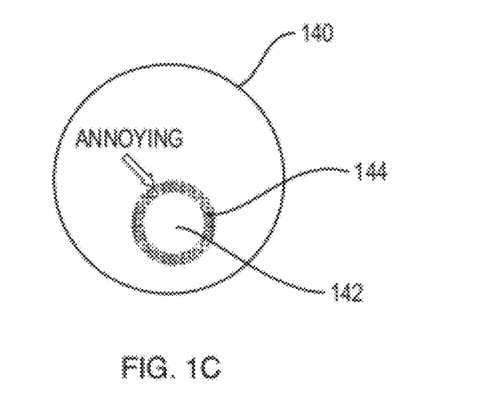
FIG. 1C is a schematic front view of a bifocal lens with a round add segment having a blended boundary.

Ophthalmic lenses may combine segmentation into multiple zones with progressive zones to improve the size and/or quality of the various viewing zones. For example, an ophthalmic lens may include a main portion with constant dioptric power for distance viewing, and an add segment with a progressive zone for intermediate-distance viewing that merges into a constant zone for near viewing. The segmented lenses generally have surface slope discontinuities across the boundaries between the zones, rendering the boundaries clearly visible. This aesthetically undesirable effect may be mitigated by "blending" the zones around their boundaries, i.e., smoothening the transitions between the zones. Such smoothening results in an interjacent zone along the boundary, in which the surface gradient varies gradually between the surface gradients on either side of the boundary. FIG. 1C schematically depicts a lens 140 featuring an add segment 142 with a blended boundary 144. Across the blended boundary, the dioptric power varies significantly, and generally both discontinuously and non-monotonously. Thus, while blending may render the boundary nearly invisible, it introduces vision distortions within the blended region.

SUMMARY

The present invention provides for multi-focal segmented ophthalmic lenses with both functional and aesthetic advantages. Various embodiments are based on the observation that users of multifocal lenses usually transition between the different viewing zones along similar eye paths and, consequently, cross the boundary between the different zones repeatedly in the same region. This fact can be exploited by segmenting the boundary into two portions, and keeping the portion of the boundary that is intersected by the eye path sharp and thereby distortion-free. The remainder of the boundary, which is typically the longer portion, may be blended away so as to decrease the visibility of the boundary between the viewing zones.

The surface gradient of the lens (e.g., on the front surface) is discontinuous across the sharp portion of the boundary between two zones. Across the blended portion of the boundary, the surface gradient transitions gradually between the zones on either side of the boundary, generally over a short distance. Thus, the blended portion of the boundary forms a narrow region interjacent the two viewing zones, which may be characterized as a separate, transitional zone. In this transitional zone, the dioptric power may vary and differ substantially from the dioptric powers in the adjacent viewing zones, thereby introducing aberrations into the lens. However, since the movement of the user's eye only seldom causes an eye path that crosses the transitional zone, the user will usually not be disturbed by the aberrations associated with the transitional zone. Lenses in accordance with these embodiments may, therefore, possess the aesthetic advantage of blended multi-segment or progressive lenses while largely retaining the functional advantage of multi-segment lenses with sharp boundaries between viewing zones.

In one aspect, the invention provides an ophthalmic lens having two surfaces (i.e., the front surface and the back surface). The lens includes a first zone having a first dioptric power distribution and a second zone having a second, different dioptric power distribution. The first and second zones may, for example, correspond to the main portion and add segment, respectively, of a bifocal lens. The boundary of the second zone includes first and second portions. A surface gradient of the first surface (which may be either the front surface or the back surface) varies discontinuously across the first portion, which is, in certain embodiments, the shorter portion. Along the second portion, a third zone separates the first zone from the second zone. The first and second portions of the boundary are, hereinafter, also referred to as the sharp and blended portions, respectively. Within the third zone, the surface gradient of the first surface varies continuously between the first and second zones. The third zone may render a transition between the first and second zones across the blended portion of the boundary of the second zone substantially invisible or inconspicuous. The first and second zones may be substantially free of distortion in regions adjacent the sharp portion of the boundary of the second zone. The sharp portion may have a length in the range from about 4 mm to about 24 mm, preferably in the range from about 6 mm to about 12 mm. The sharp portion may be located in an upper region of the boundary of the second zone and/or in a region intersecting an eye path from the first zone to the second zone. In some embodiments, the sharp portion is substantially horizontal (i.e., has an angle with respect to a horizontal line of less than 10 degrees, preferably less than 5 degrees, more preferably less than 1 degree). For example, in a D-shaped segment, the sharp portion may be the upper, straight portion of the boundary.

The dioptric power distributions of each of the first and second zones may be constant, progressive, or partially progressive (i.e., include constant and progressive sub-zones). In some embodiments, the greatest dioptric power of the first dioptric power distribution is smaller than the smallest dioptric power of the second dioptric power distribution. In certain embodiments, the second segment of the ophthalmic lens may be surrounded by a lower portion of the first zone. The first zone may be adapted for distance viewing, while the second zone may be adapted for near viewing. In some embodiments, the second zone is progressive (i.e., has a progressive dioptric power distribution) in an upper portion and constant in a lower portion. The upper portion of the second zone may be adapted for intermediate-range viewing and the lower portion for near viewing. The first zone may also be progressive. Progressive dioptric power distributions may result from progressively varying curvature of the front surface of the lens, the back surface of the lens, or a combination of both. In particular embodiments, the first surface (i.e., the surface at which the surface gradient varies discontinuously across the first portion of the boundary of the second zone) has a substantially constant curvature in each the first zone and the second zone, and the second, opposite surface has a progressively varying curvature.

In another aspect, the invention provides an ophthalmic lens including a first zone having a first dioptric power distribution that is adapted for distance viewing, a second zone having a second dioptric power distribution that is progressive and adapted for intermediate-range viewing in an upper portion of the second zone and substantially constant and adapted for near viewing in a lower portion of the second zone, and a third zone separating the first zone from the second zone only along a longer portion of the boundary between the first and second zones. A surface gradient of the lens varies substantially continuously (e.g., continuously within the limits of manufacturing precision) within the third zone between the first and second zones.

In yet another aspect, the invention provides a method of manufacturing an ophthalmic lens, such as a lens according to the first or second aspect. The method involves producing a concave mold, and casting the ophthalmic lens using the mold. The mold has first and second surface portions with respective first and second curvature distributions that are different from each other, and the casted lens has corresponding first and second surface portions with curvature distributions that are complementary to the surface distributions of the mold (i.e., that are convex where the mold is concave and vice versa). The mold is produced by cutting a raw mold part along a spiral path that does not intersect a first portion of the boundary between the first and second surface portions of the mold. As a result, the boundary between the first and second surface portions of the lens is discontinuous (i.e., sharp) in the corresponding first boundary portion, but continuous (i.e., smooth) in a second portion. The mold may be produced using a diamond-turning lathe.

BRIEF DESCRIPTION OF THE DRAWINGS

The foregoing will be more readily understood from the following detailed description, in particular, when taken in conjunction with the drawings, wherein.

DETAILED DESCRIPTION

The present invention generally relates to segmented lenses with two or more viewing zones in which at least one boundary between two viewing zones has both a sharp portion (across which the surface curvature is discontinuous) and a blended portion. (Typically, the boundary between two zones has exactly one contiguous sharp portion and exactly one contiguous blended portion. However, boundaries with discontiguous sharp and/or blended portions, i.e., multiple blended sub-portions or multiple sharp sub-portions, are also within the scope of the invention.) When the eye transitions between the two viewing zones across the sharp boundary portion, it experiences little or no distortions in vision. The blended portion, which may be described as a narrow transitional zone between the two viewing zones, serves to reduce the visibility of the boundary.

The following general definitions may be helpful in understanding the various terms and expressions used in this specification.

As used herein, a "dioptric power distribution" is the dioptric power (also referred to as refractive power or optical power, measured, e.g., in units of diopters) of the lens as a function of coordinates in the principal plane of the lens or a plane parallel thereto, i.e., a plane perpendicular to an axis along the smallest dimension of the lens. (For rotationally symmetric lenses, this axis would be the optical axis of the lens.) The dioptric power distribution results from the curvature distributions of the front and back surfaces of the lens, and is a metric of the amount by which the curvature of an optical wavefront changes as it passes through the lens. The dioptric power may include both spherical and cylindrical components: the mean power and astigmatism, respectively. The dioptric power distribution often contains aberrations, i.e., deviations from the desired power distribution, in the mean power, astigmatism, or higher-order refractive powers. In multifocal or progressive lenses, undesired astigmatism is typically the primary aberration.

As used herein, a dioptric power distribution is "substantially constant" within a specified region if the dioptric power within that region varies by less than 10%, preferably less than 3%, and even more preferably by less than 1%. Any variation of the dioptric power in a substantially constant power distribution from the nominal, desired dioptric power is a consequence of practical limitations in the manufacturing accuracy.

As used herein, a "surface gradient distribution" of a surface of the lens is the surface gradient as a function of coordinates in the principal plane, the surface gradient being mathematically defined by:

$$\sqrt{\left(\frac{\partial Z(x,y)}{dx}\right)^2 + \left(\frac{\partial Z(x,y)}{dy}\right)^2},$$

where $Z(x,y)$ is the surface height in the principal plane, x and y are orthogonal coordinates in that plane, and $$\frac{\partial}{\partial x} \text{ and } \frac{\partial}{\partial y}$$

denote differentiation with respect to the x and y directions, respectively.

As used herein, a "zone" is a portion of a lens extending from the front surface to the back surface and laterally confined by a zone boundary, wherein the zone boundary is defined by a line in the principal plane (or a plane parallel thereto) and translated into the direction perpendicular to such plane. Although the boundary, thus defined, is two-dimensional, it is the intersection line of the boundary with a surface of the lens (e.g., the front surface) which is typically relevant for purposes of this specification and the invention described therein. Accordingly, the term "boundary" may herein alternatively refer to the area laterally confining a zone of the bulk lens, or to the line circumscribing an intersection of such zone with a lens surface. The meaning in each instance will be apparent from the context. Note that the boundary is generally geometric and not necessarily physical in nature. The zones are generally, but not necessarily, defined such that they coincide with lens portions having certain distinct physical characteristics. For example, zones may (but need not) be defined such that the dioptric power of the zones is continuous within each zone, but discontinous across zone boundaries. A "viewing zone" is understood to be a lens portion whose dioptric power distribution is designed to provide a certain visual aid to the wearer (e.g., to facilitate viewing within a certain range of distance, such as in the near field). By contrast, a "transitional zone," as used herein, does not serve in itself to enhance vision, but is incidental to a desired gradual change of the surface gradient between viewing zones. For example, a (typically narrow) transitional zone results inevitably from blending a (previously sharp) boundary between two viewing zones of different dioptric powers at the boundary.

As used herein, "sharp portion" of a boundary between two zones is to be understood as a boundary segment at which the surface gradient of the lens (at the front and/or back surface) is practically discontinuous, i.e., changes abruptly, over a very short distance (perpendicular to the boundary, such as a radial distance of a circular segment) whose lower bound is limited merely by limitations to manufacturing precision and atomic dimensions. For example, the surface gradient may change by at least 0.01, at least 0.05, or at least 0.1 over a distance of less than 500 µm, less than 100 µm, less than 10 µm, less than 3 µm, or less than 1 µm, as measured perpendicular to the boundary between the segments. The abrupt transition in the surface gradient causes light scattering at sharp boundary portion, and renders it visible to the eye.

As used herein, a "blended portion" of a boundary between two (viewing) zones of the lens is to be understood as a boundary segment at which the surface gradient of the lens changes continuously. For example, the surface gradient may change by less than 0.1, less than 0.05, or less than 0.01 over a distance (perpendicular to the boundary, such as a radial distance of a circular segment) of at least 1 mm, at least 2 mm, at least 5 mm, or at least 10 mm. A blended portion may result from smoothening out the discontinuities of a sharp portion, or may be formed between the viewing zones by design, i.e., based on calculations that precede manufacture. Since blending increases the dimensionality of the "boundary" (from two to three dimensions) the blended portion may more accurately be described as a separate, transitional zone of the lens.

As used herein, a change of the surface gradient is "substantially continuous" if it is continuous within the limits of manufacturing precision (i.e., it need not be continuous in the ideal, mathematical sense).

As used herein with reference to boundaries between different zones of a lens, the terms "substantially invisible" or "substantially inconspicuous" denote that the boundary is generally not visible to the naked eye of a person of perfect vision (in frontal view), at least from a reasonable distance (e.g., about 30 cm).

As used herein, the term "substantially free of distortion" denotes the absence of irritating visual distortion (due to aberrations) in a region of a lens, or its reduction to a level that renders the distortions unnoticeable, or minimally noticeable but non-disturbing, to the wearer. In some embodiments, any aberrations that may be physically associated with a lens region or boundary segment are so small (e.g., unwanted astigmatism below 0.25 diopters) that they are not noticeable by the wearer of the lens. In some embodiments, although the aberrations cause minor (but noticeable) distortions of vision, they are still below a threshold which would render them irritating or annoying (e.g., astigmatism below 1.5 diopters).

Figure 2A:
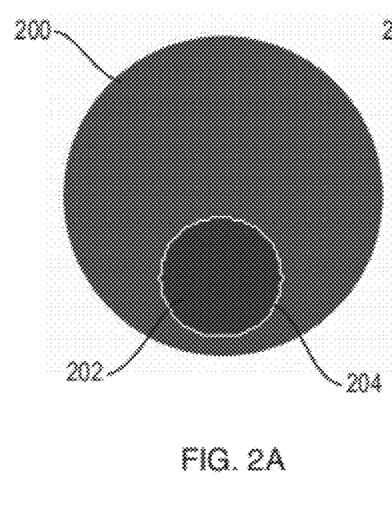
FIG. 2A is a plot of the dioptric power distribution of a bifocal lens with a round add segment.
Figure 2B:
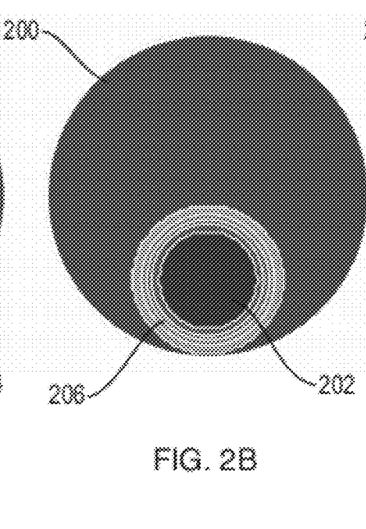
FIG. 2B is a plot of the dioptric power distribution of a lens with a round add segment having a blended boundary.
Figure 2C:
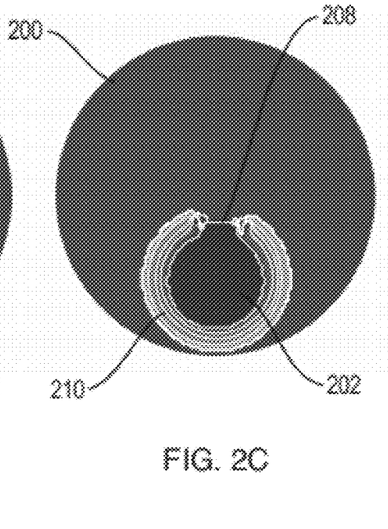
FIG. 2C is a plot of the dioptric power distribution of a bifocal lens with a round add segmented having a segmented boundary in accordance with one embodiment of the present invention.
Figure 2D:
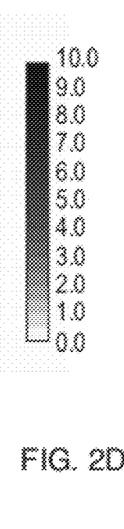
FIG. 2D is a legend for FIGS. 2A-2C.

FIGS. 2A-2C compare three exemplary segmented lenses with sharp, blended, and partially sharp/partially blended boundaries, respectively. Each of the three exemplary lenses includes a main portion 200 having a (constant) dioptric power suitable for distance vision and, integrated in the lower half of the main portion 200, a round reading segment 202 having a higher (also constant) dioptric power, suitable for near vision. FIG. 2D provides a legend for the dioptric power in units of diopters.

In FIG. 2A, the mean power distribution of a conventional segmented bifocal lens with a sharp boundary 204 between the main portion 200 and the add segment 202 is shown. The difference in dioptric powers between the main portion 200 and the add segment 202 results from a difference in the curvature of a surface of the lens. Here, the add segment 202 has a steeper curvature and protrudes above the main portion 200 on the front surface of the lens. On the surface of such a type of lens, the abrupt circular boundary 204 is clearly visible.

In FIG. 2B, the dioptric power of a blended bifocal lens is shown. A transitional zone 206 separates the main portion 200 from the add segment 202. In the transitional zone, the surface gradient varies gradually between that of the main portion 200 and that of the segment 202. As a result, the surface gradient distribution appears smooth, and the boundary is significantly less visible. However, in the transitional zone 206, the radius of curvature of the surface is non-monotonic, and generally discontinuous. For example, to achieve a smooth surface gradient transition between a planar surface of the main portion 200 and a convex surface of the add segment 202, the curvature is, somewhere in the transitional zone 206, concave. As a consequence of these drastic changes in surface curvature across the transitional zone 206, the dioptric power also undergoes significant changes. FIG. 2B illustrates, for instance, that the dioptric power of the transitional zone 206 may be lower than the dioptric power in both the main portion 200 and the segment 202. The transitional zone 206, therefore, has high levels of aberrations, so that the wearer's eye would not linger there. While this is generally unproblematic for a large portion of the boundary, the eye usually transits across the top of the boundary of the segment 202 many times a day. Each time the eye switches between the near and distance viewing zones (e.g., shifts from a paper in front of the user to a person sitting across the table), it will pass through the aberrations.

Figure 3A:
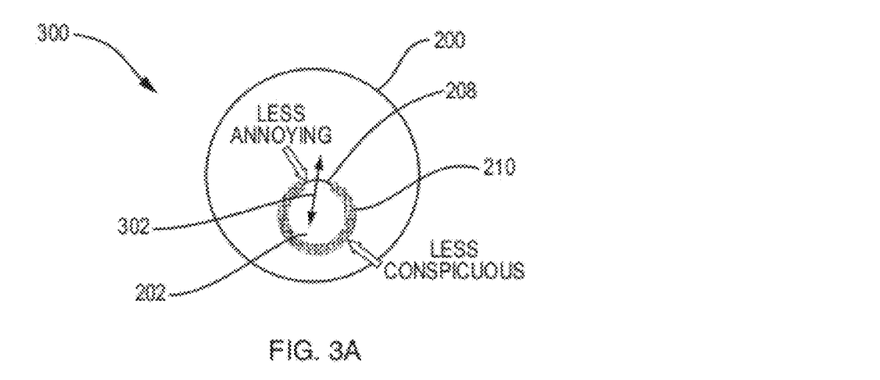
FIG. 3A is a schematic front view of a bifocal lens with a segmented boundary between a main portion of the lens and an add segment in accordance with one embodiment of the present invention.

The trade-off between low distortions and low visibility of the boundary is improved in the embodiment illustrated in FIG. 2C and, in a more conceptualized manner, in FIG. 3A. Herein, a sharp boundary portion 208 in the upper region of the boundary ensures that the user's eye is not subjected to aberrations when transitioning between the main portion 200 and the add segment 202 along its normal path, e.g., along the indicated path 302 in FIG. 3A. In some embodiments, the sharp boundary portion 208 is shifted slightly nasalward. Because the sharp boundary portion 208 does not cause aberrations, the lens 200 has almost all the visual benefits of a conventional bifocal lens with sharp segment boundaries, such as the one illustrated in FIG. 1A. In the remaining portion 210 of the boundary of the reading segment 202, the discontinuity is blended away, which renders the boundary nearly invisible. Thus, the lens 200 also has almost all the aesthetic benefits of a conventional blended bifocal lens, such as the one illustrated in FIG. 1B. Advantageously, the blended portion is only rarely encountered by the eye path. Consequently, the irritation and annoyance to the user due to visual distortions caused by the line of sight traversing the blended portion is minimized.

The blended portion may have a width (perpendicular to the boundary) of at least 500 μm, at least 1 mm, at least 2 mm, or at least 5 mm, or at least 10 mm. The sharp portion may have a length (along the boundary) of less than 24 mm, less than 16 mm, less than 12 mm, less than 6 mm, or less than 4 mm. In certain embodiments, the length of the sharp portion is in the range from about 6 mm to about 12 mm.

The reading segment 202 may be substantially circular in shape, as illustrated in FIGS. 2A-2C and 3A, and may have a diameter between 20 mm and 45 mm. However, the invention is not limited in this way, and encompasses other segment shapes (e.g., elliptical or other elongated shapes) and dimensions. In general, the shape of the reading segment depends on the dioptric power distributions of the main portion and the segment. In certain embodiments, the segment is D-shaped, having the straight portion at the top and the round portion at the bottom. The straight portion may be sharp, and the round portion may be blended. The contour of the D-shaped segment may be rounded at the corners.

Figure 3B:
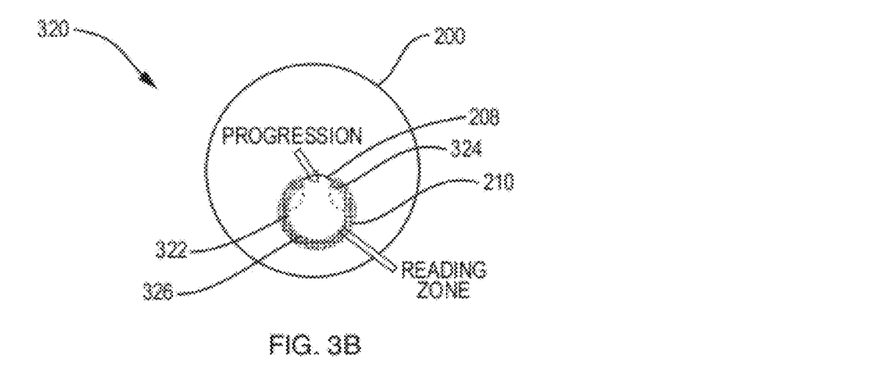
FIG. 3B is a schematic front view of a bifocal lens with a progressive add segment and a segmented boundary between the main portion of the lens and the progressive add segment in accordance with one embodiment of the present invention.

The lens may be modified in various ways to provide additional benefits and/or adjust the dioptric power distribution to a particular wearer's needs. In particular, the main portion 200 and/or segment 202 need not be of constant dioptric powers. For example, as illustrated in FIG. 3B, a bifocal lens 320, otherwise similar to the lens 300 illustrated in FIG. 3A, may have a partially progressive reading segment 322. Specifically, the reading segment 322 may have a progressive zone 324 for intermediate-distance viewing in the upper half, and a constant-dioptric-power zone 326 in the lower half. In some cases, it may be beneficial to provide a progressive surface for the main portion 200, alternatively or in addition to a progressive surface of the segment.

Figure 3C:
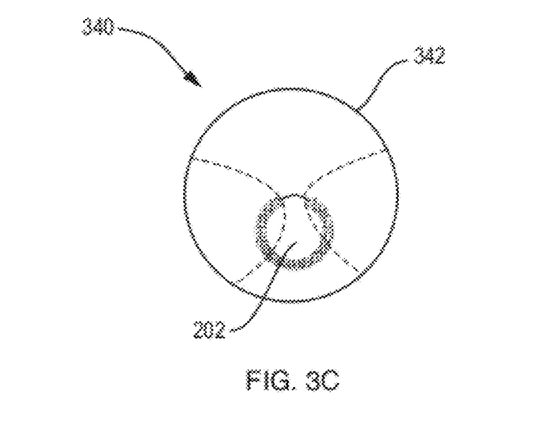
FIG. 3C is a schematic front view of a bifocal lens with progressive main portion and a segmented boundary between the progressive main portion and an add segment in accordance with one embodiment of the present invention.
Figure 3D:
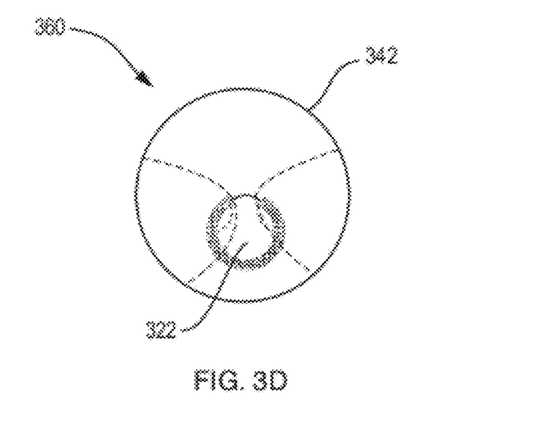
FIG. 3D is a schematic front view of a bifocal lens with a progressive main portion, a progressive add segment, and a segmented boundary therebetween in accordance with one embodiment of the present invention.

The variable dioptric power distribution may, generally, result from changes in the radius of curvature of the surface from which the reading segment protrudes, the opposite surface, or both. If only one of the main portion and the segment is progressive, the progressive zone will typically result from a varying curvature within that zone at the surface from which the segment protrudes. On the other hand, if both the main portion and the segment have progressively varying dioptric power distributions and the segment protrudes, for instance, from the front surface of the lens, the dioptric power distributions may result from a progressive front surface (in both zones), a progressive back surface, or a combination of a progressive back surface with a progressive front surface in either one or both of the zones. For example, FIG. 3C depicts a lens 340 that combines a progressive back surface with front surfaces of the main portion 342 and reading segment 304, respectively, that are each substantially spherical, i.e., have substantially constant radii of curvature. Because the dioptric powers of the front surface and the back surface add up to the overall dioptric power of the lens, this combination results in a lens that is progressive both in the main portion 342 and in the segment 304, and has a higher main power in the segment. (Alternatively, the segment could protrude from the back surface, in which case the front surface would be progressive, and the back surface would be spherical in each of the main portion and the segment.) FIG. 3D shows a lens 360 that features both a progressive back surface and a progressive front surface of the segment 322, resulting in progressive dioptric power distributions of both the main portion 342 and the reading segment 322.

Figure 4A:
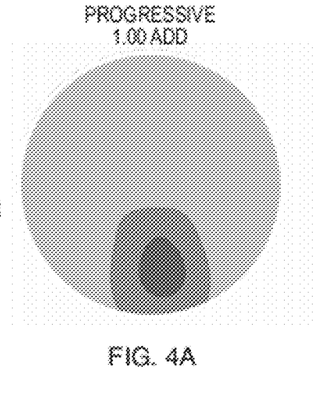
FIGS. 4A and 4B are plots of the mean dioptric power and astigmatism, respectively, of a 1.0 diopter progressive lens.
Figure 4B:
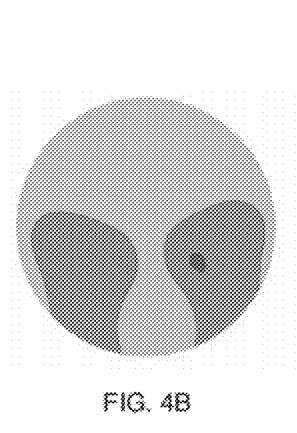
Figure 4C:
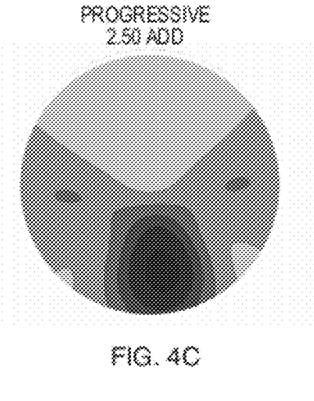
FIGS. 4C and 4D are plots of the mean dioptric power and astigmatism, respectively, of a 2.5 diopter progressive lens.
Figure 4D:
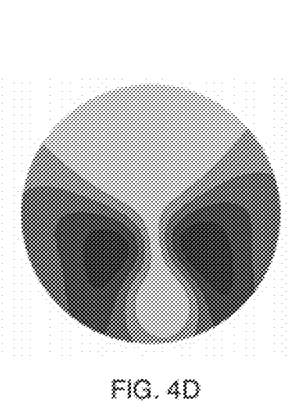
Figure 4E:
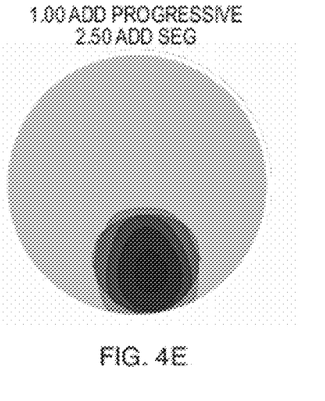
FIGS. 4E and 4F are plots of the mean dioptric power and astigmatism, respectively, of a 1.0 diopter progressive lens with a 2.5 diopter add segment.
Figure 4F:
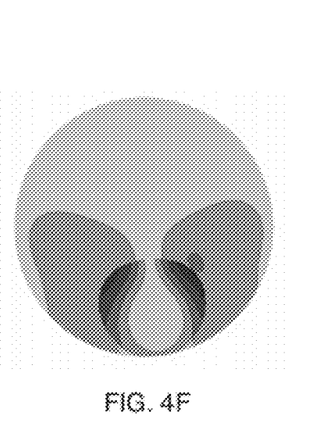
Figure 4G:
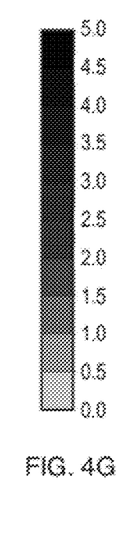
FIG. 4G is a legend for FIGS. 4A-4F.

The effect of progressive surfaces on the dioptric power distribution and aberration of a lens is illustrated in FIGS. 4A-4G. FIGS. 4A and 4B show the mean dioptric power and astigmatism, respectively, of a 1.00 D progressive lens (on a scale between 0.0 D and 5.0 D, coded on a gray scale in 0.5 D increments, as shown in the legend in FIG. 4G). Wearers typically have no difficulty adapting to such a lens because of its smooth mean power distribution and low levels of astigmatism. By contrast, a 2.50 D progressive lens, illustrated in FIGS. 4C and 4D, exhibits high levels of peripheral astigmatism and more rapid changes in mean dioptric power. The varying mean power can cause distortion in the image, and so-called "swim" as the wearer moves his or her head. The bifocal lens shown in FIGS. 4E and 4F combines a 1.00 D main portion with a 2.50 D add segment. This lens features the low distortion of the 1.00 D progressive lens over its major portion, a reading zone with a power distribution corresponding to that of the 2.50 D lens of FIG. 4C, and some high and intermediate powers. It combines advantages of progressive and conventional bifocal lenses. Of course, although not shown here, the boundary of the add segment may be blended around the lower and side portions (leaving a top portion sharp) to decrease visibility of the boundary.

Lenses in accordance with embodiments of the present invention may, generally, be manufactured from a variety of materials and using a variety of techniques known to those skilled in the technical field. For example, the lenses could be made of glass or of plastic. Glass lenses may be cast in ceramic molds, and plastic lenses may be cast in metal molds. The molds may be produced using computer-directed, numerically controlled pantograph machining. In some embodiments, the mold surface is shaped according to the desired distribution of the whole lens, including the reading segment, and the lens constructed in one piece.

In certain preferred embodiments, lenses in accordance with the invention are produced by fabricating suitable molds (typically, one for the front surface and one for the back surface), placing liquid plastic polymer (e.g., polycarbonate or allyl diglycol carbonate (CR-39)) or another suitable material between the molds, and compressing and curing the plastic polymer or other material to form the lens. Polycarbonate is typically injection molded, while CR-39 is cured in an oven. Certain other materials may be cured by exposure to UV light. The inner surface of the mold is complementary to the corresponding lens surface; for a convex lens surface, the mold is concave.

The molds may be cut on a diamond-turning lathe or milling machine in one or more passes, depending on the material used for the lens. For example, polycarbonate molds may be cut in stainless steel on a milling machine. Alternatively, they may be diamond-turned (typically using a round cutting tip with a small diameter) on nickel-plated steel; in this case, the underlying mold is typically pre-cut to minimize the amount of nickel required. For some materials, ceramic blocks are machined and then used as formers from which glass molds are slumped. The cutting process may be computer numerical controlled, and may implement a pre-determined cutting strategy. Details of these and other technologies for manufacturing molds are generally known to persons of skill in the art.

Figure 5A:
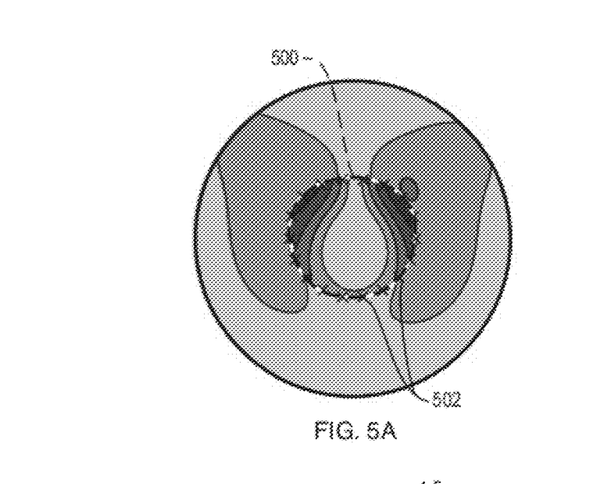
FIG. 5A is a plot of the dioptric power distribution of a bifocal lens with a translated add segment, illustrating the determination of the segment boundary in accordance with one embodiment of the present invention.
Figure 5B:
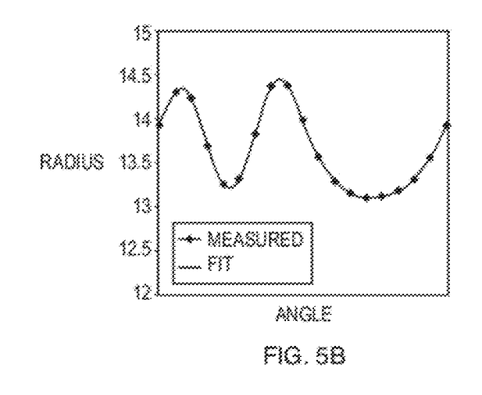
FIG. 5B is a graph of the radius of the segment boundary shown in FIG. 5A as a function of the angle, as determined in accordance with one embodiment of the present invention.
Figure 5C:
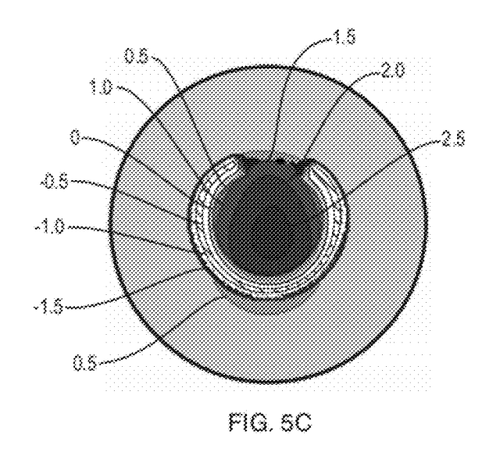
FIGS. 5C and 5D are plots of the mean dioptric power and astigmatism, respectively, of the lens shown in FIG. 5A after partial blending of the boundary in accordance with one embodiment of the present invention.
Figure 5D:
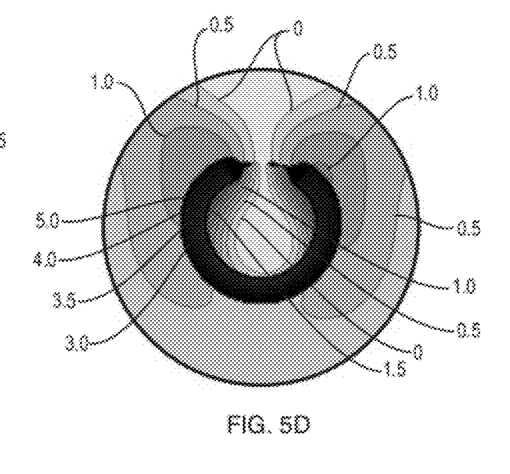
Figure 5E:
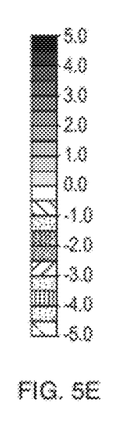
FIG. 5E is a legend for FIGS. 5C and 5D.

To manufacture a bifocal lens with a segment that is blended along a portion of its boundary, an appropriate cutting strategy is first devised. This involves determining the shape of the segment boundary. FIG. 5A shows a plot of the astigmatism, wherein the lens has been translated to place the segment in the center. The segment boundary may be determined by locating the discontinuity 500 in the surface gradient (or the discontinuity in another parameter), and determining the distance of the discontinuity from the new center of the plot for a number of angles around the segment, e.g., in 20 degree increments, as indicated by the X symbols 502 in FIG. 5A. The radius of the discontinuity (i.e., its distance from the center) may then be plotted as a function of the angle, and a smooth analytic curve may be fitted to the discrete points, as shown in FIG. 5B. In the illustrated example, a Fourier series was used to interpolate between the measured points, but in general, any interpolation scheme that yields an analytic expression for the radius of the discontinuity as a function of angle may be used. Once the location of the discontinuity is determined, a portion of the boundary is blended. FIGS. 5C and 5D show the mean power and astigmatism, respectively, of a bifocal that preserves about 8 mm of the discontinuity at the top of the segment boundary while blending the remainder of the segment over a radial length of 5 mm.

Figure 6A:
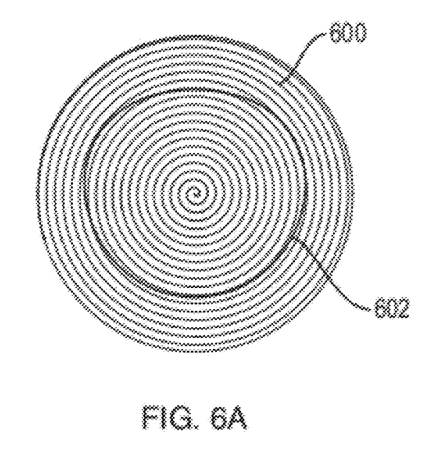
FIG. 6A is a drawing illustrating a spiral cutting path.

Cutting a mold for such a lens is difficult because the front surface contains a slope discontinuity. Milling machines and lathes prefer to cut along smooth paths, and cutting a true slope discontinuity would require infinite acceleration. To overcome this difficulty, a cutting path may be designed that results in a cut immediately below the slope discontinuity on one pass, and immediately above the discontinuity on the next pass. Such a path may be derived based on an analytic expression $R_{disc}(\theta)$ for the radius of the discontinuity by modifying the standard spiral path. A standard spiral cutting path may be described, for example, by $R_{cut} = \alpha\theta$, where $\alpha$ controls the growth rate of the spiral and $\theta$ is the accumulated angle as the cutter path loops around. FIG. 6A shows a plot of such a spiral path 600, superimposed over the original segment boundary 602. The scale has been adjusted to focus on the region containing the segment. Notice the spiral path intersects the boundary at a number of locations. The actual spiral for a diamond turned mold would be much tighter than the one displayed, and it would inevitably intersect the top, discontinuous, section of the segment boundary over many revolutions.

Figure 6B:
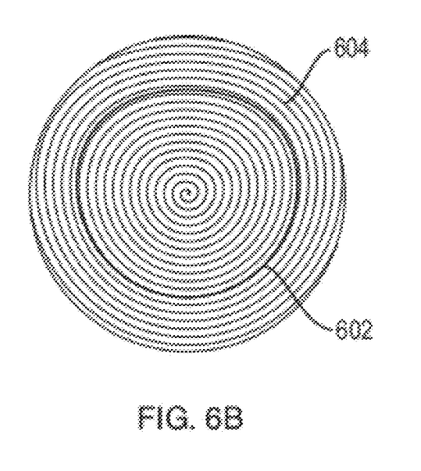
FIG. 6B is a drawing illustrating a modified spiral cutting path in accordance with one embodiment of the present invention.
Figure 6C:
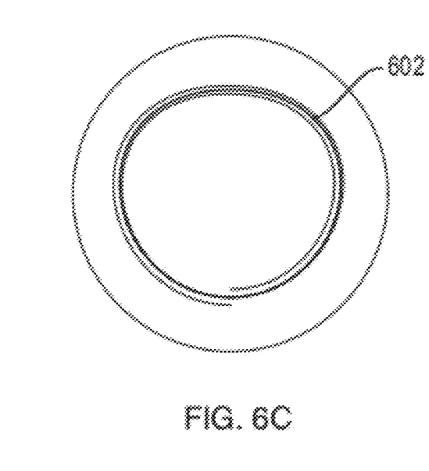
FIG. 6C is a drawing illustrating a portion close to the boundary between viewing zones of a modified spiral cutting path in accordance with one embodiment of the present invention.

FIG. 6B shows a spiral 604 that has been modified to take on the shape of the segment. This spiral may be analytically described by $$R_{cut} = \alpha\theta \frac{R_{disc}(\theta + \varphi)}{R_{disc}},$$

where $\overline{R}_{disc}$ is the average radius of the disc (e.g., the constant term in a Fourier series) and φ is the phase angle that guarantees that the spiral intersects the original discontinuity at a location diametrically opposed to the center of the sharp boundary portion. Notice how the shapes of the growing spiral mimic the shape of the segment boundary. FIG. 6C shows only the two revolutions of the cutting path of FIG. 6A that are closest to the segment boundary. As can be seen, the cutting path only intersects the segment in exactly one location, at the bottom of the segment, and this modified spiral does not intersect the segment boundary at the top (or anywhere other than at the bottom), regardless of the tightness of the pattern. The surface is smooth at the bottom of the segment, particularly along the direction of the spiral path.

While the invention has been particularly shown and described with reference to specific embodiments, it should be understood by those skilled in the art that various changes in form and detail may be made therein without departing from the spirit and scope of the invention. For example, the reading segment need not be wholly surrounded by the primary lens, but may run into the bottom of the combined lens. Further, embodiments of the invention are generally not limited to bifocal or bi-segmented lenses. As one of skill in the art will appreciate, the design principles and manufacturing methods described above are readily applicable to multi-segmented lenses and the multiple boundaries they include. The scope of the invention is thus indicated by the appended claims and all changes which come within the meaning and range of equivalency of the claims are therefore intended to be embraced.

What is claimed is:

1. An ophthalmic lens having first and second surfaces, the lens comprising:
   a first zone having a first dioptric power distribution;
   a second zone having a second dioptric power distribution different from the first dioptric power distribution, a boundary of the second zone comprising first and second portions, wherein a surface gradient of the first surface varies discontinuously across the first portion, and wherein the first portion is located in an upper region of the boundary of the second zone; and
   a third zone separating the first zone from the second zone only along the second portion of the boundary, wherein the surface gradient varies substantially continuously within the third zone from the first zone to the second zone.

2. The ophthalmic lens of claim 1 wherein the third zone renders a transition between the first and second zones across the second portion of the boundary of the second zone substantially inconspicuous.

3. The ophthalmic lens of claim 1 wherein the first and second zones are substantially free of distortion in regions adjacent the first portion of the boundary of the second zone.

4. The ophthalmic lens of claim 1 wherein the first portion of the boundary of the second zone is shorter than the second portion.

5. The ophthalmic lens of claim 1 wherein the first portion has a length between about 6 mm and about 12 mm.

6. The ophthalmic lens of claim 1 wherein the first portion is substantially horizontal.

7. The ophthalmic lens of claim 1 wherein the first portion of the boundary of the second zone is located in a region intersecting an eye path from the first zone to the second zone.

8. The ophthalmic lens of claim 1 wherein at least one of the first dioptric power distribution or the second dioptric power distribution is substantially constant.

9. The ophthalmic lens of claim 1 wherein at least one of the first dioptric power distribution and the second dioptric power distribution is at least partially progressive.

10. The ophthalmic lens of claim 1 wherein a greatest dioptric power of the first dioptric power distribution is smaller than a smallest dioptric power of the second dioptric power distribution.

11. The ophthalmic lens of claim 1 wherein the second zone is surrounded by the first zone in a lower portion thereof.

12. The ophthalmic lens of claim 1 wherein the first zone is adapted for distance viewing.

13. The ophthalmic lens of claim 12 wherein the second zone is adapted for near viewing.

14. The ophthalmic lens of claim 12 wherein the second dioptric power distribution is progressive in an upper portion of the second zone and substantially constant in a lower portion of the second zone.

15. The ophthalmic lens of claim 14 wherein the upper portion of the second zone is adapted for intermediate-range viewing and the lower portion of the second zone is adapted for near viewing.

16. The ophthalmic lens of claim 14 wherein the first dioptric power distribution is progressive.

17. The ophthalmic lens of claim 16 wherein the first surface has progressively varying curvature in at least one of the first zone or the second zone.

18. The ophthalmic lens of claim 16 wherein the second surface of the lens has progressively varying curvature.

19. The ophthalmic lens of claim 1 wherein the first surface has a substantially constant curvature in each of the first zone and the second zone, and the second surface has a progressively varying curvature.

20. An ophthalmic lens comprising:
   a first zone having a first dioptric power distribution that is adapted for distance viewing;
   a second zone having a second dioptric power distribution that is progressive and adapted for intermediate-range viewing in an upper portion of the second zone and substantially constant and adapted for near viewing in a lower portion of the second zone, a boundary of the second zone comprising a shorter portion in an upper region thereof; and
   a third zone separating the first zone from the second zone only along a longer portion of the boundary,
   wherein a surface gradient varies substantially continuously within the third zone between the first and second zones.

* * * * *